United States Patent
Makogon

(10) Patent No.: US 7,832,256 B2
(45) Date of Patent: Nov. 16, 2010

(54) METHOD AND APPARATUS FOR DETECTING THE PRESENCE OR ABSENCE OF FLUIDS IN A PIPELINE

(75) Inventor: Taras Makogon, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 947 days.

(21) Appl. No.: 11/153,945

(22) Filed: Jun. 16, 2005

(65) Prior Publication Data

US 2006/0005610 A1    Jan. 12, 2006

(51) Int. Cl.
*G01M 3/08* (2006.01)
(52) U.S. Cl. .......................................... 73/47
(58) Field of Classification Search ............... 73/47
See application file for complete search history.

(56) References Cited

U.S. PATENT DOCUMENTS

| | | | | |
|---|---|---|---|---|
| 4,159,420 A | | 6/1979 | Tsunoda ........................ 250/227 |
| 4,647,430 A | * | 3/1987 | Zweig ............................ 422/56 |
| 5,049,312 A | * | 9/1991 | Quaife et al. ............. 252/408.1 |
| 5,167,867 A | * | 12/1992 | Quaife et al. ............. 252/408.1 |
| 5,272,646 A | * | 12/1993 | Farmer .......................... 702/51 |
| 5,343,737 A | * | 9/1994 | Baumoel .................... 73/40.5 R |
| 2,360,434 A | | 10/1994 | Manning ....................... 177/311 |
| 6,145,150 A | * | 11/2000 | Knapp .................... 15/104.061 |
| 7,121,342 B2 | * | 10/2006 | Vinegar et al. .............. 166/302 |
| 2003/0121338 A1 | * | 7/2003 | Yates .......................... 73/865.8 |

FOREIGN PATENT DOCUMENTS

| | | |
|---|---|---|
| GB | 2305989 | 4/1997 |
| JP | 07140078 | 6/1995 |
| JP | 11190676 | 12/1997 |
| WO | 02096574 | 12/2002 |
| WO | 03069298 | 8/2003 |

* cited by examiner

*Primary Examiner*—Hezron Williams
*Assistant Examiner*—Rodney T Frank

(57) ABSTRACT

A method and apparatus for detecting the presence or absence of an undesirable fluid, such as water, in a pipeline and for removing the undesirable fluid are disclosed. A detecting substance, for example, sugar, naphthalene or a pigmented solid is carried by a sweeping pig. The sweeping pig is inserted into the pipeline, propelled along the pipeline and recovered from the pipeline. The detecting substance is examined upon recovery of the sweeping pig to determine whether the undesirable fluid is present in the pipeline. The pipeline can be swept multiple times until examination of the detecting substance indicates that the undesirable fluid is not present in the pipeline.

21 Claims, 2 Drawing Sheets

METHOD AND APPARATUS FOR DETECTING THE PRESENCE OR ABSENCE OF FLUIDS IN A PIPELINE

TECHNICAL FIELD

The present invention relates to a pigging device for pipelines and a method for detecting the presence of fluids in a pipeline.

BACKGROUND OF THE INVENTION

Pipelines are used to transport a variety of fluids. For example, pipelines often transport oil, gaseous hydrocarbons, water, chemical feedstocks, etc. However, under some circumstances, the presence in a pipeline of a particular type of fluid may be undesirable or detrimental either to the fluid intended to be transported or to the pipeline itself. For example, the presence of oxygen in a subsea pipeline for transporting liquid petroleum is undesirable because it promotes corrosion of the pipeline. As further example, the presence of water in a pipeline for transporting natural gas is undesirable and the presence of oil in a water pipeline can be undesirable. As used herein, "pipeline" includes reference to any particular section or portion of a pipeline.

Government regulations may require that pipelines for transporting hazardous liquids, natural gas, or petroleum products, be tested before being put into service to ensure there are no leaks in the pipeline. Even in the absence of government requirements, pipelines are commonly tested for leaks before being put into service. Pipelines may also be tested for leaks after repairs are performed. Hydraulic pressure testing is commonly performed to test a pipeline for leaks. Typically, hydraulic pressure testing is performed by pressurizing a pipeline with water to a specific pressure for a period of time. Loss of pressure would be evidence of a leak in the pipeline. After such hydraulic testing, however, it may be necessary to clear the pipeline of water before transporting the desired product.

A "pig" can be used to clear a pipeline of an undesired fluid. A pig is typically deployed in one section of the pipeline (referred to herein as the "deployment" of a pig), propelled through the pipeline, and recovered at another section of the pipeline (referred to herein as the "recovery" of a pig). Use of a pig to remove undesirable fluid from a pipeline is referred to herein as "sweeping" and each individual journey of a pig from deployment to recovery is referred to herein as a "sweep." As used herein, a "downstream" direction is the direction of a pig's travel along a pipeline during a sweep and an upstream direction is the direction along a pipeline opposite to the direction of a pig's travel along a pipeline during a sweep. Typically, a fluid is used to pressurize the section of pipe upstream of a pig propelling the pig downstream.

A "sweeping pig" generally contacts the inner surface of a pipeline and preferably maintains such contact with the inner surface during a sweep. During a sweep of a pipeline, a sweeping pig pushes contents of a pipeline downstream thereby removing such contents from the portion of the pipeline traversed by the pig. In practice, however, contact between the pig and the inner surface of the pipeline is imperfect and some of an undesirable fluid may remain in the pipeline. Several sweeps with a pig are typically required to ensure that an undesirable fluid is removed from the pipeline. The number of sweeps required can be many dozen if, for example, the pipeline has a complex profile with numerous turns, changes in elevation or extended inclines.

Sweeping pigs are typically cleaning pigs used in the art for cleaning the inside of a pipeline. Many types of cleaning pigs exist including pigs comprising foam, pigs with brushes or other scrubbing devices, or many others known and used in the art.

Sweeping pigs for sweeping pipelines such as described above can become stuck in a pipeline during a sweep. Considerable effort and time are required to extract a stuck sweeping pig from a pipeline and may result in damage to either the pig or the pipeline or both. A stuck pig usually prevents operation of a pipeline until it the pig is extracted. The more sweeps that are conducted with a sweeping pig, the greater the probability of the pig becoming stuck or otherwise damaged, and the greater probability of delay and damage to the pipeline or other equipment. It is therefore preferable to conduct no more sweeps than are necessary to remove an undesirable fluid from a pipeline. Extra sweeps are typically needed to ensure that an undesirable fluid is removed from a pipeline, but such extra sweeps increase the time, effort, and expense of a sweeping operation and increase the probability of a pig becoming stuck. Extra sweeps could be advantageously eliminated if the presence or absence of an undesirable fluid within a pipeline could be detected.

For example, an existing pipeline for the transportation of a fluid comprising subsurface hydrocarbon gases was swept to remove water after hydrostatic testing. The 40 mile stretch of pipeline was swept using prior art apparatus and equipment. 60 sweeps were performed and there was still no certainty regarding whether water was present in the pipeline. During the operation, 2 pigs became stuck in a check valve requiring a 3 day repair operation.

Other pigging devices exist for detecting irregularities, corrosion or other physical abnormalities in a pipeline. For example, U.K. Patent number 2,305,989 discloses a pigging apparatus for obtaining a substantially continuous pipeline condition profile and storing data to record a pipeline condition profile. Pigs with such monitoring and data storage apparatus are more expensive and have greater sensitivity to the stresses of sweeping a pipeline than traditional sweeping pigs. Typically, such pigs with monitoring and data storage devices are employed after undesirable fluid is removed because such fluid may be detrimental to the functioning of the monitoring and data storage apparatus. Additionally, in an operation requiring multiple sweeps, such as is typically the case when sweeping a pipeline of undesirable fluids, multiple attempts at detecting the presence of an undesirable fluid may be needed. Each additional detection attempt increases risk of damage to the pig, the pipeline and other equipment.

There is a need in the art for a simple method and apparatus for detecting the presence or absence of particular fluids in a pipeline. There is also a need for a method and apparatus to reduce the number of sweeps conducted when sweeping a pipeline to remove an undesirable fluid.

SUMMARY OF THE INVENTION

This invention is a sweeping pig for detecting the presence or absence of an undesirable fluid within a pipeline. In one embodiment, the sweeping pig comprises a body element adapted to be inserted inside a pipeline for sweeping an undesirable fluid in the pipeline, the body element having an upstream surface and an opposite facing downstream surface; and a detecting substance. The detecting substance can be a coating, for example ink or paint.

In another embodiment, the sweeping pig comprises a body element adapted to be inserted inside a pipeline for sweeping an undesirable fluid in the pipeline, the body element having an upstream surface and an opposite facing downstream surface; a holding device for a detecting substance, the holding device secured to a downstream surface of the body element; and a detecting substance held by the holding device. Preferably the body element comprises foam, for example polyurethane foam. The detecting substance can comprise a pigment soluble in the undesirable fluid. The detecting substance can comprise a coating for example an ink or paint. Optionally, the coating can be one that is soluble in the undesireable fluid. The detecting substance can comprise naphthalene. The detecting substance can be sugar. Preferably, the undesirable fluid is water and more preferably, the undesirable fluid is water and the detecting substance comprises sugar. Optionally, a second holding device can be secured to an upstream surface of the body element.

This invention is also a device for adapting a sweeping pig to detect the presence or absence of an undesirable fluid in a pipeline. In one embodiment, the device comprises a detecting substance; a holding device holding the detecting substance; and a securing element for securing the holding device to a downstream end of a sweeping pig. The detecting substance can comprise a pigment soluble in the undesirable fluid. The detecting substance can comprise naphthalene. The detecting substance can be sugar. Preferably, the undesirable fluid is water and more preferably, the undesirable fluid is water and the detecting substance comprises sugar. Optionally, a second holding device can be secured to an upstream surface of the body element.

This invention is also a method for detecting the presence or absence of an undesirable fluid in a pipeline. In one embodiment, the method comprises introducing into a pipeline a sweeping pig carrying a detecting substance; propelling the sweeping pig along the pipeline; recovering the sweeping pig; and examining the detecting substance to determine whether an undesirable fluid is present in the pipeline. Optionally, the detecting substance can be held by a holding device. The holding device can be secured to a downstream surface of the sweeping pig. The holding device can be secured to an upstream surface of the sweeping pig. The detecting substance can comprise a pigment soluble in the undesirable fluid. The detecting substance can comprise a coating. Optionally, the coating can be one that is soluble in the undesireable fluid. The detecting substance can comprise naphthalene. The detecting substance can be sugar. Preferably, the undesirable fluid is water and more preferably, the undesirable fluid is water and the detecting substance comprises sugar. Preferably the sweeping pig comprises foam.

This invention is also a method for removing an undesirable fluid from a pipeline. The method comprises: (a) performing one or more sweeps of a pipeline with a sweeping pig wherein at least one sweep is conducted with a sweeping pig carrying a detecting substance; (b) examining the detecting substance to determine if an undesirable fluid is present in the pipeline; and performing steps (a) and (b) until examination of the detecting substance indicates that the undesirable fluid is not present in the pipeline. Optionally, the detecting substance can be held by a holding device secured to a downstream surface of the sweeping pig. The detecting substance can comprise a pigment soluble in the undesirable fluid. The detecting substance can comprise a coating. Optionally, the coating can be one that is soluble in the undesireable fluid. The detecting substance can comprise naphthalene. The detecting substance can be sugar. Preferably, the undesirable fluid is water and more preferably, the undesirable fluid is water and the detecting substance comprises sugar. Preferably the sweeping pig comprises foam.

Some of the advantages of the device and method of this invention include simplicity, reduction in the number of sweeps required when removing a fluid from a pipeline, reduced opportunity for pipeline damage, and reduced potential for lost time due to stuck pigs. Numerous other advantages and features of the present invention will become readily apparent from the following detailed description of the invention, the embodiments described therein, from the claims and from the accompanying drawings.

DESCRIPTION OF THE PREFERRED EMBODIMENT(S)

Figure 1:
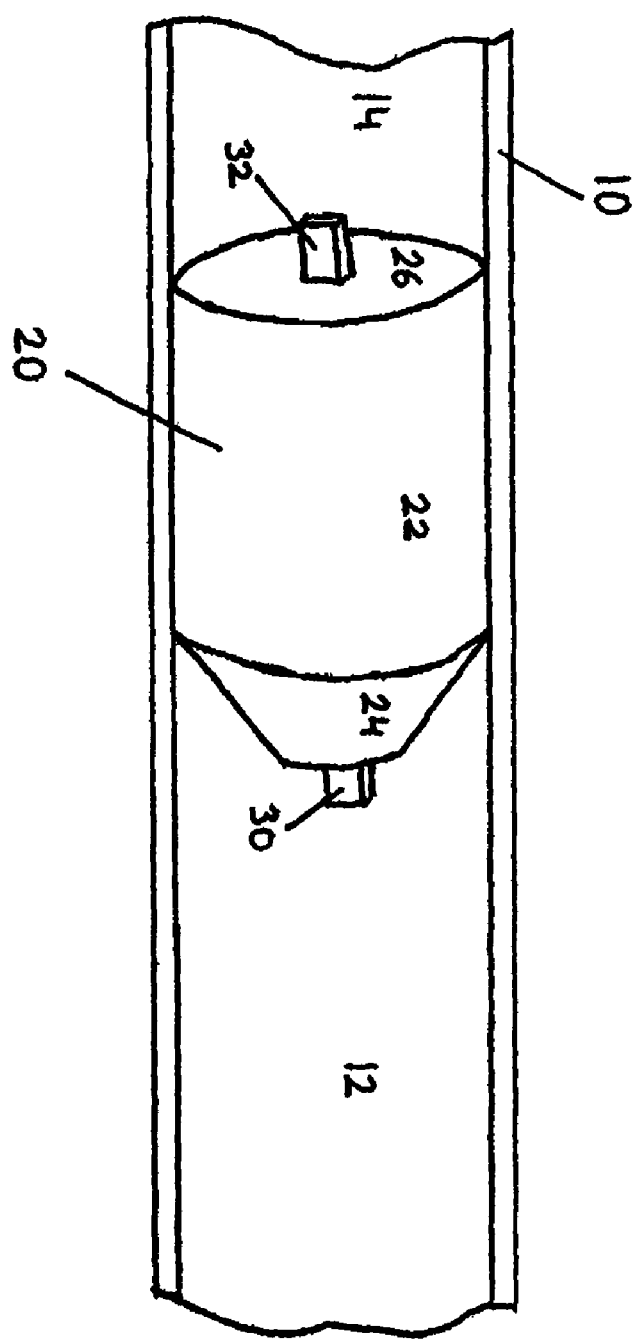
FIG. 1 is a cut away view of a pipeline and illustrates an embodiment of this invention where a pig is in the pipeline.

While this invention is susceptible of embodiment in many different forms, there is shown in the drawings, and will herein be described in detail, specific embodiments of the invention. It should be understood, however, that the present disclosure is to be considered an exemplification of the principles of the invention and is not intended to limit the invention to any specific embodiment so described.

The apparatus of this invention is a pig having detector means for detecting the presence or absence of a fluid in a pipeline. As used herein "presence" of a fluid means that the fluid is present in an amount greater than an amount desired within a pipeline. "Absence" of a fluid means that the fluid is present in an amount equal to or less than an amount desired within a pipeline.

The apparatus of this invention comprises a body element suitable for sweeping fluid from a pipeline. Such body element can be any pig which can be used to sweep a fluid from a pipeline such as those known in the art. Examples of such pigs include commercially available cleaning pigs or other pigs for removing water or other fluid from a pipeline. Body elements can be spheroid but are typically cylindrical in shape and can have one or both ends taper into a conical shape. Sweeping pigs can have brushes or other scrubbing apparatus an can have textured or grooved surfaces. Preferably, the body element is a cylindrical or bullet-shaped pig comprising a resilient foam outer body, more preferably a commercially available foam cleaning pig. The body element may be comprised of different materials, for example, the body element may have a urethane, neoprene or other coating. The body element can also comprise multiple layers of materials of like or different density.

Body elements of the kind suitable for this invention can be obtained commercially, for example, through TDW Pigging Products, or Western Filter Co., Inc., or numerous other vendors.

Optionally, a holding device which can hold a detecting substance is secured to a downstream surface of a body element. A downstream surface of a body element is a surface of a body element facing the downstream direction. An upstream surface of a body element is a surface of a body element facing the upstream direction. The downstream surface and upstream surface are not limited to a planar or flat surface and may possess simple or complex surface topographies and may possess similar or different topographies from each other. For example, an upstream or downstream surface can have a protrusions or depressions and can include conical, partially conical, rounded or other surface topography.

A "detecting substance" is one that is observably altered in the presence of the undesirable fluid but is not observably altered in like manner in the absence of the undesirable fluid and also can withstand the vibrations and motion of the sweeping pig during a sweep. As used herein, an "undesirable fluid" is any fluid, the presence or absence of which is intended to be detected. As used herein, "observably altered" means an alteration that is observable either using average human senses or using transportable equipment. Examples of observable alterations can include changes in weight, volume, color, texture, composition, etc. During a sweep, an undesirable substance, if present, contacts a detecting substance resulting in an associated observable alteration. Such observable alteration can include decrease in mass, volume, color or some other characteristic such the characteristic or the detecting substance itself is no longer observable. Examination of a detecting substance includes determination that the detecting substance is no longer observable.

As an example, sugar is a preferred detecting substance for detecting water in a petroleum fuel or natural gas pipeline because sugar is soluble in water but not soluble in petroleum fuel or natural gas. Preferably, sugar is used in its liquified and recrystallized form. In such recrystallized form, the sugar is easier to contain and better able to withstand the motion and vibration of the pig. In this example, the observable alteration can be the volume or, preferably, the weight of the sugar. The amount of sugar observed after recovering the pig indicates whether water is present in the pipeline. Conversely, naphthalene can be used as a detecting substance for detecting petroleum or other oils in a pipeline because it is not soluble in water but is soluble in petroleum or oil. As further example, a porous solid, chosen such that it does not dissolve in the environment of a pipeline to be swept, having carotenoid pigments can be a detecting substance for the presence or absence of gasoline in a pipeline. In this example, the observable alteration is the amount of carotenoid pigment remaining in the porous solid. The change in color of the porous solid observed after recovering the pig indicates whether gasoline is present in the pipeline.

Detecting substances can be coatings which are observably altered in the presence of an undesireable fluid. Such coating suitable for use in accordance with this invention can include markers, paint, ink, chemical solutions or any other coating which is observably altered in the presence of an undesireable fluid for example such coating can be soluble in the undesireable fluid, such coating could change color or otherwise observably altered. Such a coating could be placed on an upstream surface, downstream surface, or both. Such coating can be placed onto a holding device or can be applied to or adsorbed to an object held by a holding device. For example, a mark could be made on a downstream surface of a body element using a water soluble marker, paint, or other water soluble coating for the detection of water in a pipeline. A coating can be placed on a surface of the body element without use of a holding device, can be applied to a holding device or can be applied to some other object to be held by a holding device. Coatings can be used in combination with other coatings or with other detecting substances.

A holding device in accordance with this invention is suitably a container or other object with holes, openings or other configuration to allow the detecting substance to interact with an undesirable fluid, if present, within the pipeline. For example, a holding device can be a cage, a box perforated with holes, a flexible mesh, permeable fabric or any other device that will prevent deterioration of a particular detecting substance as a result of the vibrations and movement of the pig while allowing the particular detecting substance to interact with a particular undesirable fluid. The particular holding device employed can vary with the particular detecting substance used and the particular undesirable fluid. A cage is a preferred holding device. A holding device can be a strap or other fastening element capable of holding a detecting substance. For example, a holding device can be a nail or screw which holds a detecting substance or onto which a detecting substance is applied for example in the form of a coating.

A holding device can be secured to a body element by any known securing method which can withstand the movement and vibrations of the pig during a sweep. For example, the holding device may be screwed, bolted, fastened, adhered, or otherwise attached. The holding device can be removably secured to a body element such that it can be removed and reattached. A holding device can be secured to a downstream surface or an upstream surface or both. Preferably, a holding device is secured to at least a downstream surface of a body element. More than one holding device can be secured to a upstream surface and more than one holding device can be secured to a downstream surface. If more than one holding device is secured, in the same or different manner, to a body element, any of the holding devices can be the same or different from any other holding device and any holding device can hold the same or different detecting substance as any other holding device. Optionally, a holding device can hold more than one detecting substance. A holding device may hold multiple same or different detecting substances. If multiple detecting substances are used, either in the same or different holding devices, any of the multiple detecting substances can be chosen to detect the same or different undesirable fluids.

In an embodiment of this invention, two holding devices are secured to a body element. Each of the two holding devices can be the same or similar to the other holding device or the holding devices can be different. One holding device is secured to an upstream surface of the body element and one holding device is secured to a downstream surface of the body element. Each of the two holding devices can be secured to the body element in the same or similar manner as the other, or each of the two holding devices can be secured to the body element in a manner different from the other. Each holding device holds a detecting substance for detecting the same undesirable fluid. Typically, each of the two holding devices hold the same or similar detecting substances, but each of the holding devices can hold different detecting substances.

In another embodiment of this invention, a coating can be used as a detecting substance such that a mark is placed on a surface of a body element, on a holding device, or on another object secured directly or indirectly to the body element. In another embodiment, a chemical coating is adsorbed to an object carried by a holding device. One or more coatings could be used in combination with other detecting substances. The one or more coatings can be the same or different and the one or more other detecting substances can be the same or different. For example, one or more marks can be created on a one or more surfaces of a body element and one or more holding device can also be secured to the body element. In one embodiment, for detecting the presence of water, a mark is placed on a downstream surface of a body element with a water soluble ink and a holding device secures sugar which has been melted and recrystallized such that, after a sweep, the absence of the mark indicates the presence of water and the reduction in mass of the sugar indicates the extent of the presence of the water.

The apparatus of this invention can be used to determine the magnitude of the presence of an undesireable fluid by correlating the magnitude of observable alteration with the exposure to undesireable fluid required to create such an observable alteration.

The apparatus of this invention does not require specialized devices to store or transmit data collected from within a pipeline. The apparatus of this invention preferably sweeps undesireable fluid, if present, from a pipeline as it detects the undesireable fluid. The apparatus of this invention is advantageous over pigs used for detecting or monitoring aspects of a pipeline interior in that the apparatus of this invention is less likely to cause damage to itself, the pipeline or other equipment.

This invention is also a method for detecting the presence or absence of a fluid within a pipeline. Typically, pigs used to sweep a pipeline of undesirable fluids are cleaning pigs comprising foam or other suitably resilient material. Cleaning pigs are commonly cylindrical and possess an upstream surface and a downstream surface, one or both of which can have the same or different surface topographies which may be conical, rounded, or some other surface topography. Optionally, cleaning pigs may have brushes scouring pads or other surface textures along all or part of its surfaces.

A sweeping pig is deployed into a pipeline segment, propelled along the pipeline, and recovered at a recovery point. As a sweeping pig travels along a pipeline, it sweeps at least a portion of the pipeline contents downstream. Typically, multiple sweeps are conducted to remove an undesirable fluid. In accordance with the method of this invention, for at least one of the sweeps, a sweeping pig with a detecting substance optionally held by a holding device secured to a body element (hereinafter referred to as a "detecting pig") is deployed into the pipeline. The detecting pig sweeps the pipeline as it travels along the pipeline. The body element of the detecting pig can be the same as or different from any other sweeping pig used to sweep the pipeline. Preferably a detecting pig is used that has a body element similar to other sweeping pigs used to sweep a particular pipeline to the extent that the detecting pig and other sweeping pigs can be introduced into the pipeline in like manner and at the same location.

Sweeping pigs are typically propelled through a pipeline by introducing a fluid into the pipeline upstream of the sweeping pig. Such a fluid is introduced under pressure sufficient to cause the pig to move downstream along the pipeline. A detecting pig can be propelled downstream along a pipeline in like manner. As a detecting pig travels downstream, fluids in the pipeline are pushed or swept by the pig. An undesirable fluid, if present, as it is swept by a detecting pig, contacts the detecting substance and creates an observable alteration.

Detecting pigs can be recovered from the pipeline in like manner and at the same location as other sweeping pigs. Upon recovery, the detecting substance is examined for the appropriate observable alteration indicating whether a particular undesirable fluid was present in the pipeline.

Typically, multiple sweeps are conducted to remove an undesirable fluid from a pipeline. A detecting pig can be used for every sweep or it can be used intermittently. Preferably, one or more sweeps are conducted with a traditional sweeping pig before conducting a sweep with a detecting pig. If, upon recovery of a detecting pig, examination of the detecting substance or substances indicates that undesirable fluid is present in the pipeline, additional sweeps can be conducted. A detecting pig can be used for every additional sweep or it can be used intermittently. Preferably, a detecting substance is chosen such that the relative magnitude of alteration observed in additional sweeps can be used as a general indication of the relative degree to which an undesirable fluid is likely present in a pipeline. For example, if sugar is used as a detecting substance for detecting the presence of water, the relative amount of weight or volume loss observed can be used as a general indicator of the relative magnitude of water likely present in a pipeline. As a further example, the extent of fading or erosion of a coating that is sparingly soluble in an undesireable fluid could be used as a general indicator of the relative magnitude of undesireable fluid likely present in a pipeline.

Additional sweeps can be conducted using a traditional sweeping pig before conducting an additional sweep with a detecting pig. If the relative degree of alteration of a detecting substance indicates that relatively significant amounts of undesirable fluid are unlikely to be present, then, preferably, additional sweeps can be conducted with a traditional sweeping pig prior to conducting an additional sweep with a detecting pig. In one embodiment, the frequency of intermittent sweeps using a detecting pig is preferably increased as more additional sweeps are conducted.

The method of this invention advantageously reduces the number of sweeps typically conducted to remove an undesirable fluid from a pipeline. This invention also provides a simple method of detecting the presence of an undesirable fluid in a pipeline without interrupting a sweeping operation.

FIG. 1 illustrates a cut-away view of a pipeline 10 revealing a detecting pig 20. The detecting pig 20 has a body element 22. The body element has a downstream surface 24 and an upstream surface 26. A holding device 30 for a detecting substance is secured to the downstream surface 24. Another holding device 32 is secured to the upstream surface 26. A the detecting pig 20 travels along the pipeline 10, fluids in the downstream portion 12 of the pipeline 10 contact a detecting substance in holding device 30 and fluids in the upstream section 14 of the pipeline 10 contact a detecting substance in holding device 32.

Figure 2:
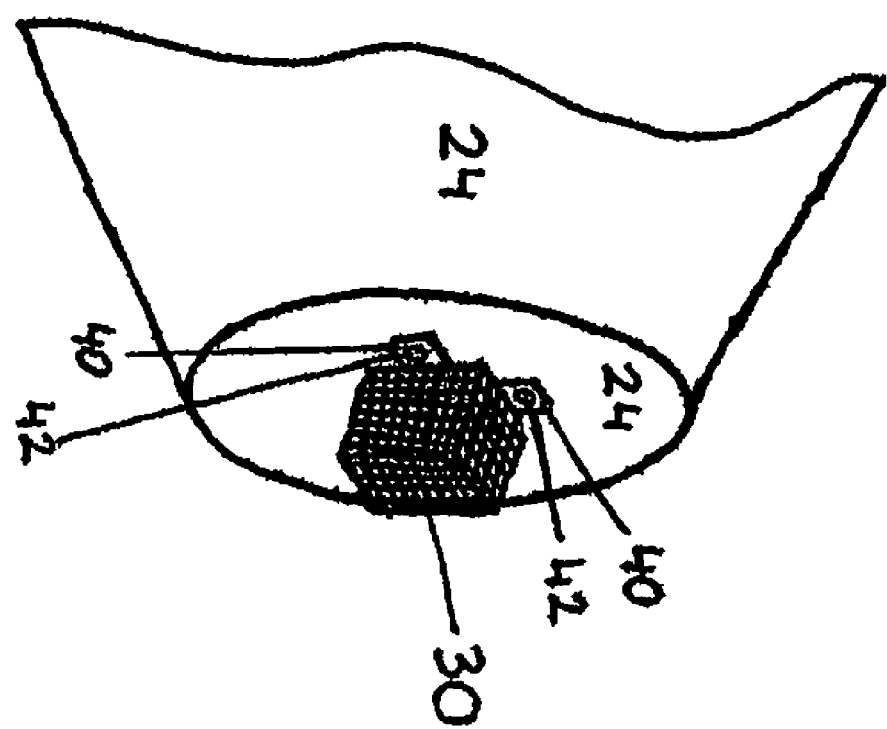
FIG. 2 is a closer view of the downstream surface of the pig of FIG. 1.

FIG. 2 is a close-up view of the downstream surface 24 of a detecting pig. A holding device 30 is a cage with tabs 40. The tabs 40 are secured to the downstream surface 24 with bolts 42.

Without limiting the scope of this invention, the following example demonstrates an embodiment of this invention.

EXAMPLE

A detecting pig was used to sweep a transparent pipeline with water present in the pipeline. The pipeline had a length of 50 feet and an inner diameter of 4 inches. A Polly Pig foam sweeping pig, commercially available from Knapp Polly Pig, Inc. was used as a body element. The body element was bullet shaped. The body element was fitted with two plastic straps, one secured to its upstream surface and one secured to its downstream surface.

A sweep without any detecting substance was performed resulting in a portion of the water being removed from the pipeline. However, observation of the transparent pipeline revealed that water was still present in the pipeline. A cube of sugar was secured in each of the two straps on the pig and another sweep was performed. Examination of the recovered pig revealed that both cubes of sugar were substantially dissolved. These results indicated that water was still present in the pipeline. Observation of the transparent pipeline confirmed that water was still present in the pipeline.

Both of the straps were refitted with cubes of sugar and another sweep was performed. Examination of the recovered pig revealed that the downstream cube of sugar was substantially dissolved. However, the upstream cube of sugar displayed no observable alteration. These results indicated that water was present in the pipeline before the sweep but that water was not present in the pipeline after the sweep. Observation of the transparent pipeline confirmed these results.

Both of the straps were refitted with cubes of sugar and 2 additional sweeps were performed to confirm the results. In both of these 2 passes, the downstream and upstream sugar cubes revealed no observable alteration indicating that water was not present in the pipeline.

The above example demonstrates that the apparatus and method of this invention successfully detects the presence of an undesirable fluid in a pipeline.

From the foregoing description, it will be observed that numerous variations, alternatives and modifications will be apparent to those skilled in the art. Accordingly, this description is to be construes as illustrative only and is for the purpose of teaching those skilled in the art the manner of carrying out the invention. Various changes may be made in the shape, materials, size and arrangement of elements. Moreover, equivalent elements may be substituted for those illustrated and described. Parts may be reversed and certain features of the invention may be used independently of other features. For example, placement of one or more holding devices may be varied and the type and amount of detecting substances can be varied and one ore more detecting substances can be used which are not held by holding devices. As further example, body elements may be of a variety of shapes including spherical, bullet-shaped, conical, cylindrical or other variation. As further example, body elements may be smooth surfaced or may have texture upon some or all of its surface, for example some surface may have depressions, protrusions, brushing, or may be grooved, or may have some pattern.

Thus, it will be appreciated that various modifications, alternatives, variations, and changes may be made without departing from the spirit and scope of the invention as defined in the appended claims.

That which is claimed is:

1. A method for detecting the presence or absence of an undesirable fluid in a pipeline, the method comprising:
   introducing into a pipeline a sweeping pig carrying a detecting substance which undergoes an observable alteration when exposed to a predetermined undesirable fluid, wherein the detecting substance is selecting from a group consisting of sugar, ink, pigment, naphthalene, markers, paint, chemical solutions, or a combination thereof;
   enabling the sweeping pig to travel within the pipeline;
   recovering the sweeping pig from the pipeline; and
   visually examining the detecting substance to determine whether an observable alteration of the detecting substance has occurred; and
   thereby determining whether the undesirable fluid is present within the pipeline.

2. The method of claim 1 wherein the detecting substance comprises a coating on a surface of the pig.

3. The method of claim 2 wherein the detecting substance comprises an ink soluble in water, and wherein the undesirable fluid is water.

4. The method of claim 1 wherein the detecting substance is a sugar cube held by a holding device secured to a downstream surface of the sweeping pig.

5. The method of claim 4 wherein the undesirable fluid is comprised of water.

6. The method of claim 1 wherein the detecting substance comprises a sugar cube held by a holding device secured to an upstream surface of the sweeping pig.

7. The method of claim 1 wherein the undesirable fluid is selected from gasoline, water, oil, or a combination thereof.

8. The method of claim 1 wherein the detecting substance comprises naphthalene, and wherein the undesirable fluid is selected from gasoline, oil, or a combination thereof.

9. The method of claim 1 wherein at least a part of the sweeping pig comprises foam.

10. The method of claim 1, further comprising:
    (a) performing one or more sweeps of a pipeline with a sweeping pig, wherein at least one sweep is conducted with the sweeping pig carrying a detecting substance;
    (b) examining the detecting substance to determine if an undesirable fluid is present in the pipeline; and
    (c) repeating steps (a) and (b) a desired number of times until examination of the detecting substance indicates that the undesirable fluid is not present in the pipeline.

11. The method of claim 10 wherein the detecting substance comprises a coating.

12. The method of claim 11 wherein the coating comprises an ink soluble in the undesirable fluid.

13. The method of claim 10 wherein the detecting substance is held by a holding device secured to a surface of the sweeping pig, wherein the holding device is selected from a cage or a box perforated with holes, and wherein the holding device is attached to the pig by a screw, a bolt, a fastener, or a combination thereof.

14. The method of claim 10 wherein the undesirable fluid is water.

15. The method of claim 10 wherein the detecting substance is selected from the group consisting of sugar, a pigment, naphthalene, or a combination thereof.

16. The method of claim 1 wherein the detecting substance is held by a holding device secured to a surface of the sweeping pig, wherein the holding device is selected from a cage or a box perforated with holes, and wherein the holding device is attached to the pig by a screw, a bolt, a fastener, or a combination thereof.

17. The method of claim 1 wherein the pigment, dye, paint, or ink is applied directly to an outside surface of the pig.

18. The method of claim 1 wherein the observable alteration is comprised of a dissolving, a texture change, a composition change, a color change, or a combination thereof.

19. The method of claim 1 wherein the pig has a smooth surface.

20. The method of claim 1 wherein the pig has a texture upon some or all of its surface, and wherein the texture is selected from depressions, protrusions, brushings, grooves, or a combination thereof.

21. A method for detecting the presence or absence of an undesirable fluid in a pipeline, the method comprising:
    obtaining a pipeline pig device, and attaching a substance to the pig which is capable of detecting a presence of an undesirable fluid within the pipeline, wherein the undesirable fluid is selected from gasoline, water, oil, or a combination thereof;
    introducing the pipeline pig into a pipeline;
    pressurizing the pipeline if there is not already enough pressure within the pipeline to allow the pig to travel through the pipeline;
    allowing the pig to travel through at least a portion of the pipeline to thereby allowing the detecting substance to contact any undesired fluid in the traveled portion of the pipeline;
    recovering the pig from the pipeline; and
    examining the detecting substance for any observable alteration of the detecting substance to thereby determine whether an undesirable fluid is present in the pipeline.

* * * * *